United States Patent [19]
Sugden et al.

[11] Patent Number: 5,801,935
[45] Date of Patent: Sep. 1, 1998

[54] DIGITAL POWER FACTOR CORRECTION CIRCUIT

[75] Inventors: David M. Sugden, Leeds, United Kingdom; Phillip G. Langhorst, St. Louis, Mo.; Joseph G. Marcinkiewicz, Ripon; James C. R. Smart, Horsforth, both of United Kingdom

[73] Assignees: Emerson Electric Co., St. Louis, Mo.; Switched Reluctance Drives, Ltd., Harrogate, United Kingdom

[21] Appl. No.: 708,804

[22] Filed: Sep. 9, 1996

[30] Foreign Application Priority Data

Apr. 30, 1996 [GB] United Kingdom ............... 9608832

[51] Int. Cl.⁶ ............................................. H02M 7/217
[52] U.S. Cl. ............................ 363/89; 323/222; 323/284
[58] Field of Search .................................. 363/124, 126, 363/89; 323/222, 283, 284, 285

[56] References Cited

U.S. PATENT DOCUMENTS

| | | | |
|---|---|---|---|
| 4,361,792 | 11/1982 | Davis, Jr. et al. | 318/799 |
| 4,459,529 | 7/1984 | Johnson | 318/798 |
| 4,581,568 | 4/1986 | Fitzpatrick et al. | 318/778 |
| 5,151,642 | 9/1992 | Lombardi et al. | 318/779 |
| 5,389,869 | 2/1995 | Anderson | 318/729 |
| 5,481,451 | 1/1996 | Kuwahara | 363/41 |
| 5,656,923 | 8/1997 | Schultz et al. | 323/207 |

OTHER PUBLICATIONS

Linear Technology Corporation, "Power Factor Controller:LT1248," 1993, pp. 1–12.
Unitrode Integrated Circuits, "Enhanced High Power Factor Preregulator:UC1854A/B, UC2854A/B, UC3854A/B," May 1993, pp. 5–226 to 5–228.
Unitrode Integrated Circuits, "High Power Factor Preregulator:UC1854, UC2854, UC3854," Feb. 1993, pp. 5–218 to 5–225.
Unitrode Integrated Circuits, "High Power–Factor Preregulator:UC1852, UC2852, UC3852," Dec. 1992, pp. 5–213 to 5–217.

*Primary Examiner*—Peter S. Wong
*Assistant Examiner*—Derek J. Jardieu
*Attorney, Agent, or Firm*—Arnold, White & Durkee

[57] ABSTRACT

A digital power factor correction circuit including a digital comparator that compares the actual DC bus voltage of an electric circuit with a desired DC bus voltage to produce a digital attenuation signal in the form of a pulse width modulated signal that is used to attenuate the voltage from a time-varying source. The attenuated source voltage is used as the current demand signal for a current controller that controls the current drawn from the line.

22 Claims, 3 Drawing Sheets

DIGITAL POWER FACTOR CORRECTION CIRCUIT

FIELD OF THE INVENTION

This invention relates to power factor correction circuits and methods for controlling the power factor of an electrical circuit.

BACKGROUND OF THE INVENTION

In general, the "power factor" of an electrical load refers to the ratio of the actual power provided to the load to the apparent power applied to the load. The power factor is closely tied to the phase relationship between the electrical current drawn by the load and the electrical voltage applied to the load from a source of electrical power. If the drawn current is completely in-phase with the applied voltage and is of the same shape as the applied voltage waveform then a near unity power factor (i.e., a power factor of 1) is obtained.

High power factors are desirable for various reasons, including energy efficiency. In general, the higher the power factor of a load, the greater the efficiency of the load. Further, the higher the power factor the less the load distorts the voltage waveform provided by the source of electrical power. To avoid significant distortion of the voltage waveforms provided by power utilities, certain countries have promulgated regulations requiring electrical devices above a certain power rating to have a minimum power factor.

In practice, electrical circuits do not have unity power factors. In certain applications, such as motor control circuits that utilize a converter or inverter operating from a DC bus, the power factor can vary significantly from unity. Such circuits typically use a full wave rectifier in combination with a relatively large DC bus capacitor to convert sinusoidal alternating input voltage into substantially constant unidirectional voltage. In such applications power factor correction circuits (PFC circuits) are often used to improve the power factor.

There are several commercially available PFC circuits. For example, Unitrode Integrated Circuits Corp., Merrimack, N.H. offers a family of high power-factor pre-regulators under the model numbers UC1852, UC2852 and UC3852 and Linear Technology Corp., Milpitas, Calif. offers a power factor controller model number LT1248. These PFC devices are normally fabricated in analog integrated circuit chips and operate as analog circuits. In general, these devices use pulse width modulated power switching electronics to improve the power factors of circuits, such as switched reluctance motor controllers, that utilize DC bus voltages.

FIG. 1 illustrates the operation of an exemplary analog PFC chip 20. The circuit receives applied sinusoidal AC voltage at the inputs of a full wave rectifier 10 and produces a full wave rectified sinusoidal voltage at the output of the rectifier. The full wave rectified sinusoidal voltage from the rectifier is applied to one terminal of a filtering inductor 12. Coupled to the other terminal of the inductor 12 is a switching device 16 such as a power MOSFET or an IGBT. The other terminal of the switching device 16 is coupled to the negative rail of the DC bus. A PFC chip 20 provides switching signals to switch the switching device 16 on and off. The PFC chip 20 receives as inputs a full wave rectified sinusoidal voltage which is in phase with the sinusoidal voltage applied to the rectifier 10. The PFC chip 20 also receives a signal representing the desired voltage across the DC bus ($V_{REF}$). A DC bus capacitor 18 is coupled across the positive and negative rails of the DC bus. A diode 14 is provided to prevent current from flowing back to the line from the load.

In operation, the PFC chip 20 opens and closes switching device 16 so that the load across the full wave rectifier 10 varies from the inductor 12 (when switch 16 is closed) to the inductor and the DC bus capacitor 18 (when switch 16 is opened). This is accomplished through the use of a current control circuit 26. Current control circuit 26 operates according to known techniques to switch switching device 16. The current input command to the current control circuit is provided by an analog multiplier 25 which multiplies the $V_{SINE}$ input (containing the phase information) with a signal from analog differential amplifier 22 corresponding to the difference between the desired DC bus voltage ($V_{REF}$) and a signal corresponding to the actual bus voltage. In FIG. 1, the voltage corresponding to the actual bus voltage is taken from a voltage divider comprising resistors 28a and 28b. By properly switching switch 16 in a manner corresponding to the voltage variations in the sinusoidal input to full wave rectifier 10, the power factor of the system may be improved.

One limitation of known PFC circuits, such as chip 20 in FIG. 1, is that they require analog circuitry, such as analog differential amplifier 22 and analog multiplier 25. The manufacture of such analog circuits is relatively difficult and relatively expensive when compared to the manufacture of circuits employing digital circuits. It is an object of the present invention to overcome these and other problems in the prior art by providing a digital PFC chip that is easily implemented and provides cost and manufacturing advantages over known analog PFC chips.

SUMMARY OF THE INVENTION

In accordance with one aspect of the present invention, a power factor correction circuit for improving the power factor of an electric circuit including a DC bus is provided, where the electric circuit operates from an AC line voltage. In this embodiment, the power factor correction circuit includes a rectifier coupled to the AC line voltage for providing a rectified voltage signal; a switching device that, when closed, provides a current path from the positive output of the rectifier to the reference output of the rectifier via a filter inductor; a current sensor for sensing the current flowing through the switching device; a pulse width modulation controlled attenuator coupled to the output of the rectifier, wherein the pulse width modulation controlled attenuator provides an attenuated version of the rectified voltage signal that has a magnitude corresponding to a pulse width modulation control signal; and a current controller coupled to the current sensor and the variable attenuator for controlling the switching device such that the current flowing through the switching device is substantially in phase with the attenuated version of the rectified voltage signal and has a magnitude corresponding the magnitude of the attenuated version of the rectified signal.

A further embodiment of the present invention involves the use in a power factor correction circuit of a digital power factor correction chip, formed as a single integrated circuit, that includes a digital comparator for comparing a voltage corresponding to the desired DC bus voltage with a voltage corresponding to the actual DC bus voltage; an up/down counter having an up/down control input coupled the output of the digital comparator and a clock input adapted to receive a fixed frequency clock signal; and a digital pulse width modulation generator coupled to receive the output of the up/down counter, for generating the pulse width modulation control signal, where the duty cycle of the pulse width modulation control signal corresponds to the output of the up/down counter. In this embodiment, the pulse width modulation control signal is used to control a pulse width modulation controlled attenuator that attenuates the source voltage.

A method of improving the power factor of an electric circuit is also disclosed.

BRIEF DESCRIPTION OF THE DRAWINGS

Other aspects and advantages of the present invention will become apparent upon reading the following detailed description and upon reference to the drawings in which.

Similar reference characters indicate similar parts throughout the several views of the drawings.

DETAILED DESCRIPTION OF THE INVENTION

Figure 2:
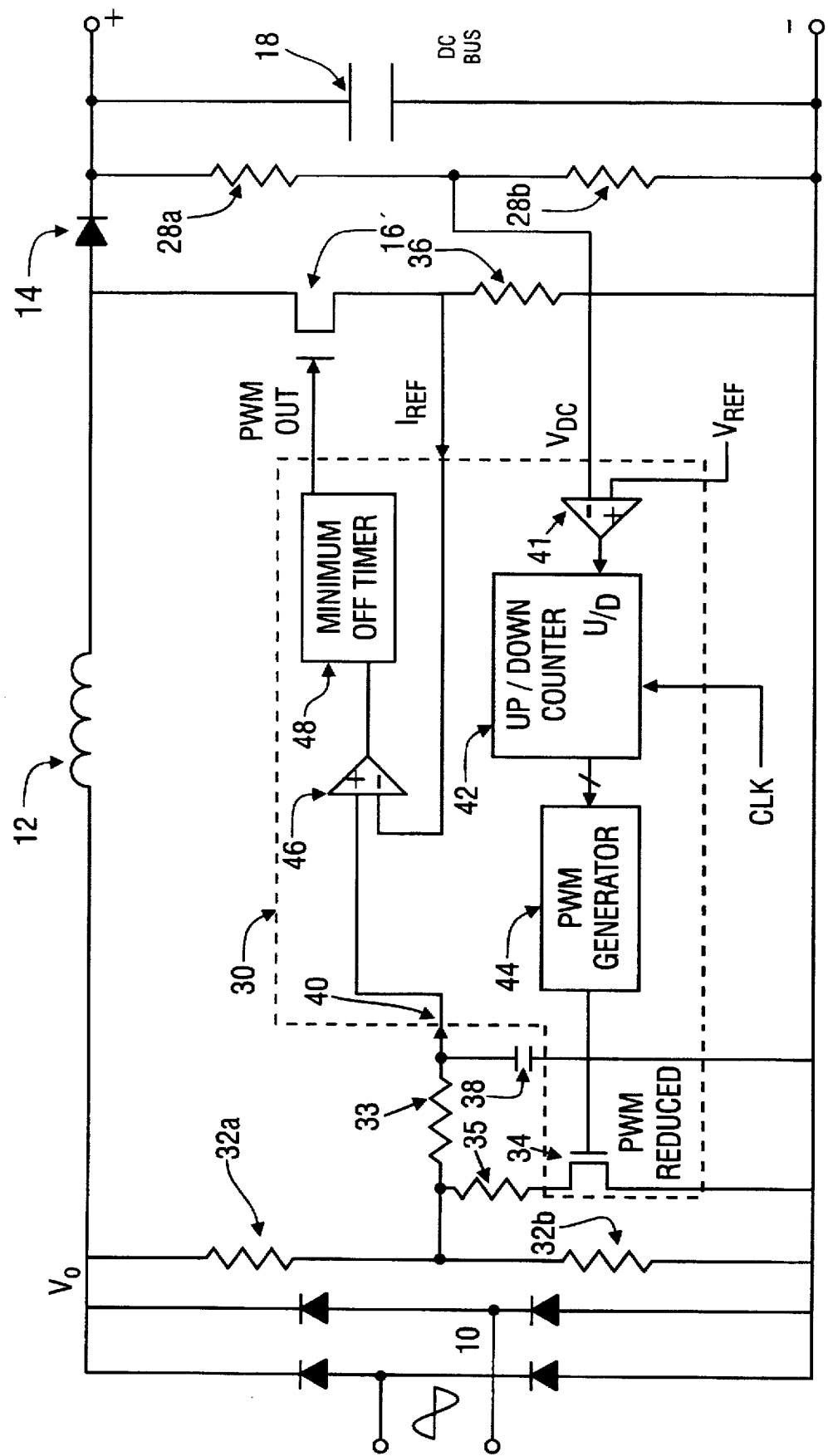
FIG. 2 is a schematic diagram of a digital PFC chip in accordance with the present invention.

Turning now to FIG. 2, a digital PFC circuit 30 in accordance with the present invention is illustrated.

Figure 1:
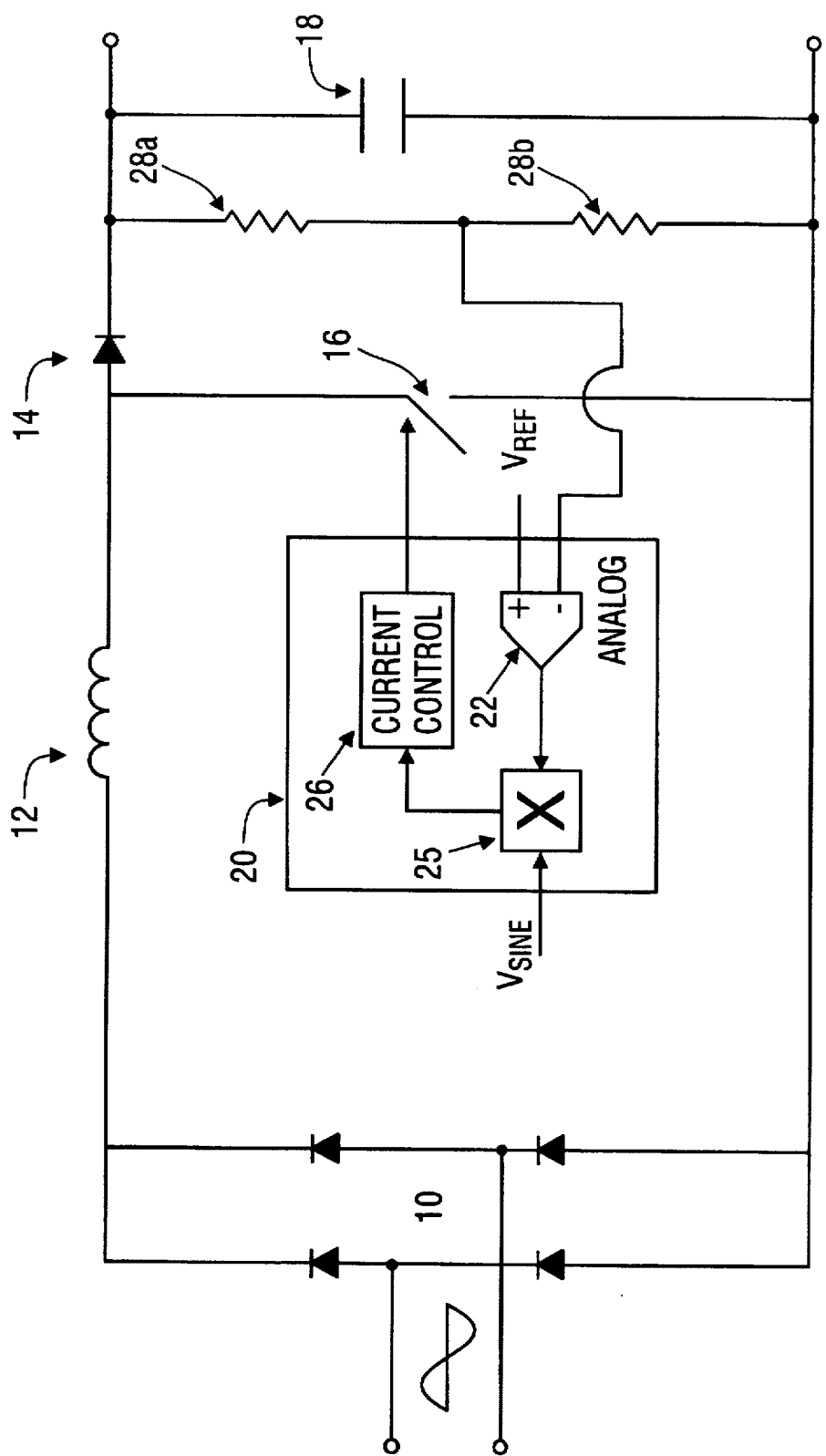
FIG. 1 is a schematic diagram of a prior art analog PFC chip.

In FIG. 2, as in the circuit of FIG. 1, a sinusoidal AC signal is applied to the input of a full wave rectifier 10 which provides a full wave rectified sinusoidal signal at its output. Coupled to one output of the rectifier 10 is an inductor 12. Inductor 12 is also coupled to the positive rail of the DC bus via a diode 14. As in FIG. 1, a switching device 16' is connected across the output of inductor 12 and the reference rail of the DC bus. A PFC circuit 30 controls the switching of switching device 16' such that the power factor of the circuit is improved.

Unlike the circuit of FIG. 1, the embodiment of the present invention illustrated in FIG. 2 utilizes a digital PFC chip 30 to control the switching of switching device 16'. The digital PFC chip receives a signal representative of the desired DC bus voltage ($V_{REF}$) and through the use of digital circuitry controls the switching of switching device 16' to both provide the desired DC bus voltage and to improve the power factor of the circuit.

In general, the digital PFC chip 30 uses a controlled digital attenuator to provide an attenuated voltage signal that is in phase with the applied AC line voltage and has a magnitude that varies in response to the desired DC bus voltage and the actual DC bus voltage. That attenuated voltage signal is then used as a current command for a current controller that controls the current drawn from the AC line. The controlled digital attenuator can comprise a network of resistors connected to a switch which is controlled by a pulse width modulation signal. One embodiment of such an arrangement is illustrated in FIG. 2.

Referring to FIG. 2, the switching of switching device 16' is controlled to provide an improved power factor for the circuit by ensuring that the current drawn from the AC line is substantially in phase with the applied AC voltage. In the circuit of FIG. 2, this is accomplished though the use of a minimum off timer 48, digital comparator 46 and current feedback resistor 36. In a preferred embodiment, the digital comparator 46 and minimum off timer 48 are both located within the PFC chip 30.

As described more fully below, when PFC chip 30 is operating, a sinusoidal voltage signal that is in phase with the AC voltage applied to rectifier 10 is applied to the input 40 of digital PFC chip 30. This sinusoidal voltage signal is compared with a current feedback signal in digital comparator 46. The current feedback signal corresponds to the current flowing through resistor 36, and generally corresponds to the current that is drawn from the AC line by the circuit. Digital comparator 46 compares the current feedback signal with the sinusoidal voltage signal provided at input 40 and, through minimum off timer 48 controls the switching of switch 16'.

In the embodiment of FIG. 2, when the current feedback signal is less than the voltage at input 40, the output from digital comparator 46 will be a logic high and the switching device 16' will be switched ON, or closed. In this configuration, increasing current will flow from the output of rectifier 10, through the inductor 12 and through the series circuit of switching device 16' and resistor 36. As the current flowing through resistor 36 increases, a point will be reached where the current feedback signal exceeds the voltage on input 40. When this occurs, the output of digital comparator 46 will change from logic high to logic low and the switching device 16' will be switched OFF and the current will be diverted through diode 14 and will be used to charge DC bus capacitor 18. When switching device 16' is opened, the current flowing through resistor 36 will drop to zero, and the output of digital comparator 41 change back from logic low to logic high. After the time interval of minimum off/timer 48 has expired, which in a preferred embodiment is 10 μ sec, switching device 16' will again be switched ON and the process will repeat.

As the above discussion indicates, minimum off-timer 48, digital comparator 46 and current feedback resistor 36 operate to draw current from rectifier 10 that: (i) is in phase with the voltage applied to input 40; and (ii) has a magnitude that corresponds to the magnitude of the voltage applied at input 40.

In FIG. 2 the voltage applied to the input 40 of the digital PFC chip 30 is an attenuated version of the output of the full wave rectifier 10 that is substantially in phase with the AC line voltage applied to rectifier 10. As described below, the magnitude of the voltage applied to input 40 is controlled by digital PFC chip 30 to maintain the DC bus voltage at a desired level.

In the embodiment of FIG. 2, the full wave rectified sinusoidal voltage appearing at the output of the rectifier is divided down by a voltage divider comprising resistors 32a and 32b. The voltage appearing at the junction of resistors 32a and 32b is applied to an input 40 of the digital PFC chip 30 via a resistor 33.

Coupled to the junction of resistors 32a, 32b and 33 is a resistor 35, which is coupled to the negative rail of the DC bus by a switching device 34. Switching device 34 may be an IGBT, a MOSFET, a power transistor or the like. When switching device 34 is open, there is no current path from the junction of resistors 32a, 32b and 35 through resistor 35 to ground. As such, when switching device 34 is open, it is as if the resistor 35 is not present and the voltage appearing at the input 40 of digital PFC chip 30 will be a reduced version of the full wave rectified sinusoidal voltage appearing at the output of rectifier 10 where the instantaneous voltage applied to the input 40 ($V_{40}$) is roughly the instantaneous voltage at the output of rectifier times $R_{32b}/(R_{32a}+R_{32b})$, where $R_{32a}$ and $R_{32b}$ represent the resistances of resistors 32a and 32b respectively. When switching device 34 is closed, there is a current path from the junction of resistors 32a, 32b and 35 through resistor 35 to ground and it is if the resistor 35 is connected in parallel with resistor 32b. Thus, when switching device 34 is closed, the voltage appearing at the input 40 of digital PFC chip 30 will be a reduced version of the full wave rectified sinusoidal voltage $V_o$ appearing at the output of rectifier 10 where the instantaneous voltage applied to the input 40 ($V_{40}$) is roughly the instantaneous voltage at the output of rectifier times $R_x/(R_{32a}+R_x)$, where $R_x$ is the value of the parallel resistors 32b and 35 which is $(R_{32b}*R_{35})/(R_{32b}+R_{35})$. Since $R_x$ will always be less than $R_{35}$, the voltage that appears at the input 40 of digital PFC chip 30 will be a smaller fraction of the output of rectifier 10 when switching device 34 is closed than when it is open.

By controlling the percentage of time that switching device 34 is closed (i.e., its "on time"), it is possible to control the magnitude of the voltage applied to input 40 of the digital PFC chip 30 from a maximum of $V_o*R_{32b}/(R_{32a}+R_{32b})$, when the on-time duty cycle is 0%, to a minimum value of $V_o*R_x/(R_{32a}+R_x)$ when the on-time duty cycle is 100%. In this manner, the resistive divider comprising resistors 32a, 32b and 35 form a variable pulse width modulation ("PWM") controlled attenuator.

The relative values of resistors 32a, 32b and 35 will depend on the particular application and the magnitude of the AC voltage that will be applied to the rectifier 10. If the AC input voltage is around 110V, then the value of $V_o$ will be around 170V. Assuming that around 1W could be dissipated in the resistors, this would require the sum of $R_{32a}$ and $R_{32b}$ to be around 30 kΩ. Suitable values for these two resistors would be 30 kΩ and 500 Ω respectively. The value of $R_{35}$ could then be chosen to be around 20% of $R_{32b}$, i.e. around 100 Ω. $R_{33}$ is simply chosen according to normal practice to provide, in conjunction with capacitor 38, a suitable filter time constant for the voltage $V_{40}$ so that the riffle due to the switching action of switch 34 is suppressed. A value of 5 kΩ would be appropriate.

In the embodiment of FIG. 2, the PWM duty cycle of the switching device 34 is controlled by a digital pulse width modulation generator 44, of conventional construction which is located on the PFC chip 30. As those skilled in the art will appreciate, a digital PWM generator receives as its input a digital word corresponding to a particular duty-cycle and produces a PWM signal of constant repetition rate that has the desired duty cycle.

In FIG. 2, the digital word which forms the input to digital PWM generator 44 is provided by an UP/DOWN counter 42. UP/DOWN counter 42, which is located on the PFC chip 30, receives as inputs an external clock signal (CLK) and an UP/DOWN control signal from digital comparator 41.

In operation, digital comparator 41 compares a voltage signal representing the desired DC bus voltage with a signal corresponding to the actual DC bus voltage. In FIG. 2, the signal corresponding to the DC bus voltage ($V_{DC}$) is taken from a voltage divider comprising resistors 28a and 28b. Unlike the analog differential amplifier 22 from FIG. 1, digital comparator 41 in FIG. 2 does not provide an analog output that represents the difference between its inputs; it merely provides a digital output where, for example, a logic 1 indicates that $V_{REF}$ is greater than $V_{DC}$, and a logic 0 indicates that $V_{DC}$ is greater than $V_{REF}$.

The logic 1 or logic 0 output from digital comparator 41 is applied to the UP/DOWN input of counter 42. As such, counter 42 will count UP as long as $V_{REF}$ is greater than $V_{DC}$ and will begin to count down when $V_{DC}$ exceeds $V_{REF}$. Thus, in steady-state operation, when the DC bus voltage is near the desired DC bus voltage, the counter 42 will provide at its output a digital word that hovers around a certain nominal value that corresponds to the desired DC bus voltage.

The digital word from counter 42 is provided to the PWM generator 44 and is used to control the switching of switching device 34 and thus the magnitude of the voltage applied to input 40. In the embodiment of FIG. 2, the count corresponds to the off-time for the pulse width modulated control signal (i.e., the portion of time switch 34 is open). Thus, a high count from counter 42 represents a high DC bus voltage and correspondingly the switching device 34 will be switched such that the voltage applied to input 40 is at its maximum possible value. Progressively lower counts from counter 44 corresponds to a switching duty cycle of switching device 34 such that the magnitude of the voltage applied to input 40 is reduced.

The digital PFC chip 30 of FIG. 30 controls the switching of switching devices 34 and 16' such that the desired DC bus voltage is maintained and the power factor of the circuit is improved. In particular, when the circuit is first operated, the magnitude of the DC bus voltage will be less than that of the desired DC bus voltage. As such, counter 44 will begin to count up, causing the magnitude of the input applied to input 40 to progressively increase. At some point, the magnitude of the DC bus voltage will reach and exceed the desired DC bus voltage, causing the counter 42 to begin counting down and reducing the magnitude of the voltage applied to input 40. This will in turn cause a slight reduction in the DC bus voltage, which will cause counter 42 to begin counting up again. Eventually a steady-state condition will be reached where the output of counter 42 hovers around a certain value.

In addition to controlling the magnitude of the DC bus voltage, as described above, the digital PFC chip 30 of FIG. 2 also improves the power factor by switching device 16' such that the current drawn from the rectifier 10 is in phase with the voltage applied to input 40 which—in FIG. 2—is in phase with the voltage applied to the input of rectifier 10.

The system shown in FIG. 2 is a basic system which, while generally producing the required output, can suffer from sub-harmonic oscillation. This is because the controller feedback system only has an integral term. An alternate embodiment is shown in FIG. 3.

Figure 3:
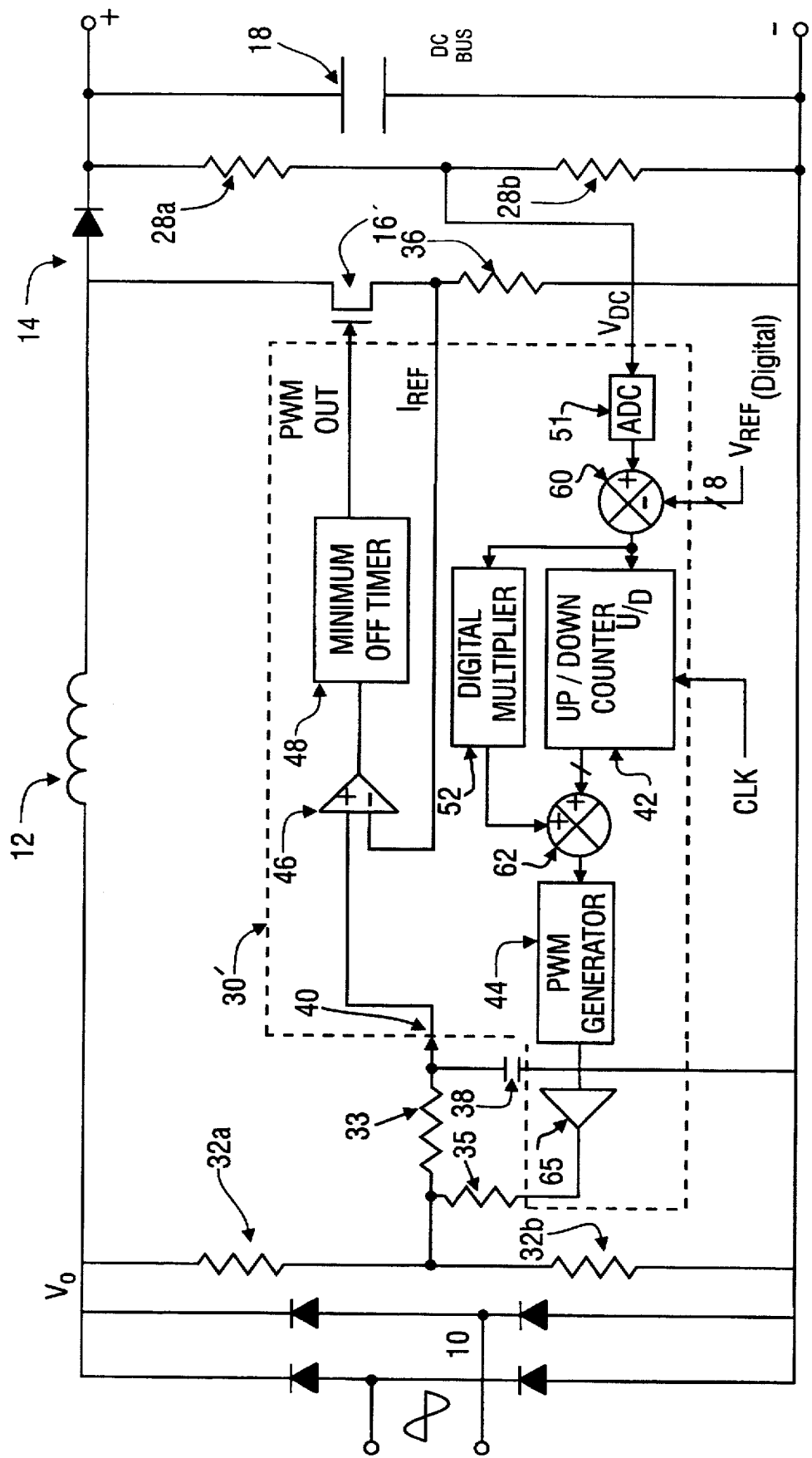
FIG. 3 is a schematic diagram of a further embodiment of a digital PFC chip in accordance with the present invention.

In FIG. 3, the comparator 41 of FIG. 2 is replaced by an analog to digital converter (ADC) 51 and a digital multiplier 52 is added to the circuit. This changes the controller feedback system from integral only to proportional plus integral (P+I).

The analog to digital converter 51 provides a digital representation of the DC bus voltage, in a manner familiar to those skilled in the art. This digital word is subtracted from a digital voltage demand reference in digital subtractor 60 to produce a bus voltage error (BVE). This is multiplied in the digital multiplier circuit 52 with either a pre-programmed or an externally multiplication factor. This multiplier effectively adds a P gain term. The up/down counter 42 of FIG. 2 continues to supply an I gain term, the P and I terms being added in a digital adder 62 before being supplied to the PWM generator. The switch 34 of FIG. 2 can be replaced by a buffer 65, as shown in FIG. 3. Those skilled in the art will recognize that the I gain term may also be pre-programmed or externally programmed. This embodiment results in the bus voltage being held stabile and avoids any tendency for low-frequency oscillations to appear on the bus voltage.

The remainder of the circuitry of FIG. 3 operates in a manner similar to the circuitry of FIG. 2.

The above description of several embodiments is made by way of example and not for purposes of limitation. The present invention is intended to be limited only by the spirit and scope of the following claims.

What is claimed is:

1. A power factor correction circuit for improving the power factor of an electric circuit including a DC bus, where the electric circuit operates from an AC line voltage, the power factor correction circuit comprising:

a rectifier coupled to the AC line voltage for providing a rectified voltage signal, the rectifier having a positive output and a reference output;

a switching device that, when closed, provides a current path from the positive output of the rectifier to the reference output of the rectifier;

a current sensor for sensing the current flowing through the switching device;

a controlled attenuator coupled to the output of the rectifier, wherein the controlled attenuator provides an attenuated version of the rectified voltage signal that has a magnitude corresponding to a pulse width modulation control signal; and a current controller coupled to the current sensor and the controlled attenuator for controlling the switching device such that the current flowing through the switching device is substantially in phase with the attenuated version of the rectified voltage signal and has a magnitude corresponding to the magnitude of the attenuated version of the rectified signal.

2. The circuit of claim 1 further comprising an inductor coupled between the positive output of the rectifier and the switching device.

3. The circuit of claim 1 wherein the pulse width modulation control signal is provided by a digital circuit comprising:

a digital comparator for comparing a voltage corresponding to the desired DC bus voltage with a voltage corresponding to the actual DC bus voltage;

an up/down counter having an up/down control input coupled to the output of the digital comparator and a clock input adapted to receive a fixed frequency clock signal; and a digital pulse width modulation generator coupled to receive the output of the up/down counter for generating the pulse width modulation control signal, where the duty cycle of the pulse width modulation control signal corresponds to the output of the up/down counter.

4. The circuit of claim 3 wherein the controlled attenuator comprises:

a voltage divider comprising a first resistor coupled to the positive output of the rectifier and a second resistor coupled to the first resistor and to the reference output of the rectifier;

a third resistor electrically coupled to the junction of the first resistor and the second resistor;

a switching device that, when closed, provides a current path from the junction of the first and second resistors, through the third resistor, to the reference output of the rectifier, wherein the switching device is controlled by the pulse width modulation control signal.

5. The circuit of claim 1 wherein the current sensor comprises a sense resistor coupled between the switching device and the reference output of the rectifier.

6. The circuit of claim 5 wherein the current controller comprises a digital comparator for comparing the voltage across the sense resistor with the attenuated version of the rectified voltage signal and wherein the output of the digital comparator controls the switching of the switching device.

7. The circuit of claim 6 further comprising a minimum off timer coupled between the digital comparator and the switching device.

8. The circuit of claim 6 wherein the switching device is open when the output of the digital comparator is logic low, and wherein the output of the digital comparator is logic low when the voltage across the sense resistor is greater than the attenuated version of the rectified voltage.

9. The circuit of claim 3 wherein the output of the digital comparator is logic high when the voltage corresponding to the desired DC bus voltage is greater than the voltage corresponding to the actual DC bus voltage.

10. The circuit of claim 9 wherein the up/down counter counts up whenever the output of the digital comparator is logic high.

11. The circuit of claim 1 wherein the pulse width modulation control signal is provided by a digital circuit comprising:

an analog to digital converter for connecting a voltage repress the actual DC bus voltage to a digital value corresponding to the actual DC bus voltage;

a digital subtractor for providing a digital value corresponding to the difference between the digital value corresponding to the desired DC bus voltage and a digital value representing the desired DC bus voltage;

a digital pulse width modulation generator coupled to receive the output of the digital subtractor for generating the pulse width modulation control signal, where the duty cycle of the pulse width modulation control signal corresponds to the output of the digital subtractor.

12. The circuit of claim 11 further including an up/down counter responsive to the output of the digital subtractor wherein the duty cycle of the pulse width modulation control signal corresponds to the sum of the output of the up/down counter and the output of the digital subtractor.

13. The circuit of claim 11 wherein the controlled attenuator comprises a buffer coupled to receive the pulse width modulation control signal, a resistor coupled to the output of the buffer and to a voltage divider coupled across the output of the rectifier.

14. A circuit for controlling the power factor of an electric circuit that operates from a DC bus powered by an AC line, the circuit comprising:

a rectifier coupled to the AC line for providing a rectified voltage signal, the rectifier having a positive output and a reference output;

a first switching device that, when closed, provides a current path from the positive output of the rectifier to the reference output of the rectifier;

a current sensor for sensing the current flowing through the switching device;

a controlled attenuator coupled to the output of the rectifier, wherein the controlled attenuator provides an attenuated version of the rectified voltage signal that has a magnitude corresponding to a pulse width modulation control signal; and a digital power factor correction chip, formed as a single integrated circuit, comprising:

a digital comparator for comparing a voltage corresponding to the desired DC bus voltage with a voltage corresponding to the actual DC bus voltage;

an up/down counter having an up/down control input coupled to the output of the digital comparator and a clock input adapted to receive a fixed frequency clock signal; and a digital pulse width modulation generator coupled to receive the output of the up/down counter, for generating the pulse width modulation control signal, where the duty cycle of the pulse width modulation control signal corresponds to the output of the up/down counter; and a current controller coupled to receive the output of the current sensor and the controlled attenuator for controlling the switching device such that the current flowing through the switching device is substantially in phase with the attenuated version of the rectified voltage signal and has a magnitude corresponding to the magnitude of the attenuated version of the rectified signal.

15. The circuit of claim 14 wherein the controlled attenuator comprises:

a voltage divider comprising a first resistor coupled to the positive output of the rectifier and a second resistor coupled to the first resistor and to the reference output of the rectifier;

a third resistor electrically coupled to the junction of the first resistor and the second resistor;

a second switching device that, when closed, provides a current path from the junction of the first and second resistors, through the third resistor, to the reference output of the rectifier, wherein the switching device is controlled by the pulse width modulation control signal.

16. The circuit of claim 14 wherein the current controller comprises a digital comparator for comparing the voltage across the sense resistor with the attenuated version of the rectified voltage signal and wherein the output of the digital comparator controls the switching of the switching device.

17. The circuit of claim 16 further comprising a minimum off timer coupled between the digital comparator and the switching device.

18. The circuit of claim 16 wherein the switching device is open when the output of the digital comparator is logic low, and wherein the output of the digital comparator is logic low when the voltage across the sense resistor is greater than the attenuated version of the rectified voltage.

19. The circuit of claim 14 wherein the output of the digital comparator is logic high when the voltage corresponding to the desired DC bus voltage is greater than the voltage corresponding to the actual DC bus voltage.

20. The circuit of claim 19 wherein the up/down counter counts up whenever the output of the digital comparator is logic high.

21. A method of improving the power factor of an electric circuit that receives power from a time varying voltage source and provides a DC bus voltage in response to the time varying source, the method comprising the steps of:

comparing the actual DC bus voltage with a desired DC bus voltage and providing a digital signal indicating whether the desired DC bus voltage is greater than the actual DC bus voltage;

incrementing the count of an up/down counter on a periodic basis whenever the desired DC bus voltage is greater than the actual DC bus voltage, and decrementing the count of the up/down counter whenever the desired DC bus voltage is less than the actual DC bus voltage;

generating a pulse width modulation signal having a duty cycle that corresponds to the count of the up/down counter;

attenuating the source voltage by an amount corresponding to the duty cycle of the pulse width modulation signal; and actuating a switching device coupled to the electric circuit to draw a current that is in phase with the attenuated source voltage and has a magnitude corresponding to the magnitude of the attenuated source voltage.

22. The method of claim 21 further comprising the step of providing the source voltage by rectifying an AC line voltage.

* * * * *

UNITED STATES PATENT AND TRADEMARK OFFICE
CERTIFICATE OF CORRECTION

PATENT NO. : 5,801,935

DATED : September 1, 1998

INVENTOR(S) : David M. Sugden, Phillip G. Langhorst, Joseph G. Marcinkiewicz and James C. R. Smart It is certified that error appears in the above-identified patent and that said Letters Patent is hereby corrected as shown below:

In column 5, line 61, after "is", please delete "greater Man" and insert therefor -- greater than --.

In column 6, line 14, after "of", please delete "FIG. 30" and insert therefor -- FIG. 2 --.

In column 6, line 61, after "held", please delete "stabile" and insert therefor -- stable --.

Signed and Sealed this

Twenty-second Day of June, 1999

Attest:

Q. TODD DICKINSON

*Attesting Officer*   *Acting Commissioner of Patents and Trademarks*